(12) United States Patent
Eichberger et al.

(10) Patent No.: US 7,819,218 B2
(45) Date of Patent: Oct. 26, 2010

(54) DEFLECTING DEVICE FOR AN OFFSET FRONTAL COLLISION FOR MOTOR VEHICLES

(75) Inventors: Arno Eichberger, Österreich (AT);
Franz Hubmann, Österreich (AT);
Friedrich Pernkopf, Österreich (AT);
Wolfgang Schimpl, Österreich (AT);
Stephan Winkler, Österreich (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 862 days.

(21) Appl. No.: 11/597,008

(22) PCT Filed: May 17, 2005

(86) PCT No.: PCT/AT2005/000166

§ 371 (c)(1),
(2), (4) Date: Jan. 25, 2007

(87) PCT Pub. No.: WO2005/110815

PCT Pub. Date: Nov. 24, 2005

(65) Prior Publication Data

US 2008/0023954 A1    Jan. 31, 2008

(30) Foreign Application Priority Data

May 17, 2004    (AT) .............................. GM361/2004

(51) Int. Cl.
*B60R 19/00*    (2006.01)
(52) U.S. Cl. .................... 180/274; 296/187.1; 293/114; 293/150
(58) Field of Classification Search ................. 280/784; 180/274, 311; 296/187.1; 293/114, 132, 293/141, 149, 150, 21
See application file for complete search history.

(56) References Cited

U.S. PATENT DOCUMENTS

| 2,196,561 | A | * | 4/1940 | Lester ........................ 293/154 |
| 2,508,836 | A |   | 5/1950 | Morris |
| 2,519,429 | A |   | 8/1950 | Brandvold |
| 3,499,661 | A | * | 3/1970 | Rowe, Jr. .................... 280/794 |
| 3,907,352 | A | * | 9/1975 | Spain et al. ................. 293/152 |
| 4,148,505 | A | * | 4/1979 | Jensen et al. ................ 280/784 |
| 4,182,529 | A | * | 1/1980 | Taylor ........................ 293/132 |
| 4,291,911 | A | * | 9/1981 | Gallmeyer ................. 296/77.1 |
| 5,275,436 | A |   | 1/1994 | Pomero |

(Continued)

FOREIGN PATENT DOCUMENTS

DE    195 32 858    2/1997

*Primary Examiner*—Paul N. Dickson
*Assistant Examiner*—Timothy D Wilhelm
(74) *Attorney, Agent, or Firm*—Bachman & LaPointe, P.C.

(57) ABSTRACT

In a motor vehicle, a deflecting device (11) for an offset frontal collision for the motor vehicle is arranged in front of a front wheel (6). In order, in the event of a collision, to safely pivot the front wheel inward, the deflecting device (11) forms a kinematic chain, the coupling link of which is a deflector (12) which, under the action of a frontal impact, is pivoted to the rear and is displaced toward the outside of the vehicle. The kinematic chain is a slider crank mechanism comprising a swinging arm (13) which is pivotable about a bearing (14), a further bearing (16), a sliding guide (16) and the coupling link (12) which is connected to the outer end of the swinging arm at a pivot point (15) and is guided in the further bearing (16).

10 Claims, 6 Drawing Sheets

U.S. PATENT DOCUMENTS

| | | | |
|---|---|---|---|
| 6,338,510 B1 * | 1/2002 | Kanamori et al. | 293/154 |
| 6,511,119 B2 * | 1/2003 | Takase et al. | 296/187.09 |
| 6,866,115 B2 * | 3/2005 | Miyasaka | 180/311 |
| 6,957,846 B2 * | 10/2005 | Saeki | 296/187.1 |
| 2007/0132223 A1 * | 6/2007 | Scheffzuek | 280/784 |

* cited by examiner

DEFLECTING DEVICE FOR AN OFFSET FRONTAL COLLISION FOR MOTOR VEHICLES

CROSS REFERENCE TO RELATED APPLICATIONS

This case is the U.S. national phase of International Application No. PCT/AT2005/000166 filed May 17, 2005 which claims priority of Austrian Application No. GM 361/2004 filed May 17, 2004.

BACKGROUND OF THE INVENTION

The invention relates to a deflecting device for an offset frontal collision for motor vehicles, the front end of which vehicles has a left and a right longitudinal member, the deflecting device being arranged in front of a front wheel and protecting the front wheel in the event of a collision. An offset frontal collision is to be understood as meaning a frontal collision in which the colliding vehicles move toward each other with directional vectors which are substantially parallel but are offset laterally in relation to one another. The collision zone is therefore only a lateral part of the front end of the vehicle.

In vehicles, this lateral part of the front end of the vehicle in front of the passenger compartment is usually less rigid than the central part in front of the passenger compartment and also absorbs less collision energy, resulting in considerable deformations of the passenger compartment. In particular, there is the risk of the particular wheel penetrating the passenger compartment. Furthermore, in the case of collisions of this type, a particularly hazardous phenomenon also occurs: even in the event of a relatively small offset, the collision-side front wheels of the two vehicles become interlocked; one wheel at least of the one vehicle collides with the wheel suspension of the other, and vice versa. As a result, the wheels are not only subject to particularly severe longitudinal forces which push them into the passenger compartment, but the two vehicles are connected at least partially to each other in an interlocking manner and are thus prevented from passing each other by. In addition, the two interlocked vehicles are jointly also caused to twist about the vertical axis.

This phenomenon is known in the literature under the term "interlocking". DE 195 32 858 A1 discloses, as a countermeasure, designing the front bumper to be greatly rounded in the side region, in plan view, and to be sufficiently rigid that it prevents the collision-side front wheels from coming into contact and causes the two vehicles to pass each other by. It is conceivable that the bumper may never be strong enough for this purpose at the collision speeds customary nowadays. In addition, the bumper also has to satisfy other safety requirements which run counter to it: a collision surface which is as wide as possible for non entirely overlapping offset frontal collision and apportioned yielding in the event of a collision with a pedestrian.

U.S. Pat. No. 5,275,436 furthermore discloses providing, in front of and behind the front wheels, approximately vertical deflecting plates which are aligned and curved in the horizontal in such a manner that they positively pivot the wheel inward in the event of a collision. However, these deflecting plates are also constructed in a very heavy manner if they are actually to have this effect, and they likewise require a particularly heavy bumper involving the abovementioned disadvantages. However, above all, the effect of the front deflecting plate is inadequate for kinematic reasons: if it is arranged at a sufficient distance in front of the wheel and does not extend over the outer vertical boundary surface of the wheel, its outer end pivots inward on a circular arc. It then touches the wheel within its outer vertical boundary surface and can no longer grasp it and pivot it inward. On the contrary, it destroys the wheel and the deflecting action does not occur.

Furthermore, U.S. Pat. No. 2,519,429 discloses a bumper, on the swept-back parts of which, which are fixed on the vehicle, deflectors are fitted which are displaceable counter to the force of a tension spring in order to push the vehicle laterally away from the obstacle. From a certain displacement to the rear, the deflectors tip to the rear. In the process, they only bear against a point of the part fixed on the vehicle, and are therefore freely movable and cannot absorb or exert any force. Since the deflector is freely movable, there is no kinematic chain which could cause a wheel, either a wheel of the dedicated vehicle or of its collision counterpart, to turn in. In addition, in the event of an offset frontal collision, that part of the bumper which is fixed on the vehicle will deform in such a manner that it presses the wheel situated behind it into the vehicle. However, it is precisely such an intrusion which is to be prevented.

Finally, U.S. Pat. No. 2,508,836 discloses a bumper, to the parts of which, which are fixed on the vehicle, deflectors which are swept-back toward the front are fitted in order to deflect oncoming bodies. For this purpose, the deflectors are connected displaceably in their longitudinal direction at a point in the vicinity of their outer end to a crossmember, which is supported in relation to the vehicle via spring cups, and are connected to one another at their front end. In the event of a collision between the two displaceable supports, the two deflectors are jointly pressed in toward the crossmember and are therefore brought into their extended position and the spring cups are pressed in. The special case of a collision outside one of the two displaceable supports is not provided for and is not discussed.

The invention is based on the object of reliably bringing about an engagement embracing the front wheel concerned in order to deflect the impact directed from a colliding vehicle away from the front wheel concerned, and to do this with a minimal outlay on construction.

SUMMARY OF THE INVENTION

According to the invention, this is achieved in that the deflecting device forms a kinematic chain which is situated approximately in a horizontal plane and the coupling link of which is a deflector which, under the action of a frontal impact, pivots rearward positively guided and is displaced toward the outside of the vehicle. The displacement of the deflector to the outside causes it to embrace and grasp the wheel securely from the outside without destroying it at this early stage. This already has a positive effect on the form taken by the damage. At the same time, a positive turning in of the wheel can occur as a positive side effect. If the wheel is destroyed in the further course of the collision, it has already fulfilled its task—that of deflecting the collision counterpart and of preventing intrusions. It is noticeable that this effect reliably occurs without additional measures, merely by means of the collision energy itself.

The kinematic chain can be produced in two kinematically equivalent embodiments. In the first, simpler embodiment, the kinematic chain is a four-bar linkage which comprises two swinging arms which are pivotable about bearings connected to the longitudinal support and the coupling link which is connected to the outer ends of the swinging arms at pivot points and reaches beyond the outer pivot point of the vehicle. The desired curve of the path of the coupling point—i.e. the outermost point of the deflector—is therefore formed with the swinging arms having handy dimensions and using simple pivots.

In the second embodiment, the kinematic chain is a slider crank mechanism which comprises a swinging arm which is pivotable about bearings connected to the longitudinal member, a further bearing, a sliding guide and the coupling link which is connected to the outer end of the swinging arm at a pivot point and is guided in the further bearing and reaches beyond the outer pivot point of the vehicle. Among other things, the sliding guide affords the advantage of being able to be designed with a narrow fit, so that it provides a certain resistance to an initial displacement.

In a variant of this embodiment, the sliding guide is arranged in the further bearing. It therefore displaces the entire deflector in the further bearing which is connected to the longitudinal member and which also has to be rotatable. In a preferred variant, the deflector comprises two parts which are displaceable telescopically one inside the other, the part which is further inward on the vehicle being pivotable in the further bearing and the further outward of the two parts on the vehicle being connected to the one swinging arm at a pivot point, and the sliding guide being provided between the parts which are displaceable one inside the other.

The deflector itself is an arm which is of sufficiently rigid design and, in a collision-free position, preferably protrudes laterally in a manner inclined slightly rearward from the longitudinal member and the outer end of which is bent rearward. The inclined orientation is kinematically favorable and the bent end ensures that the wheel is actually also entirely engaged around.

Finally, it lies within the scope of the invention, for supporting measures, to provide that a connecting means which acts on the tie rod of the steering system of the motor vehicle acts on the deflecting device. Even if normally the collision energy is sufficient, owing to the device according to the invention, to force the wheel concerned to lock, supporting measures of this type may occasionally be added.

One such supporting measure is made possible by the fact that the connecting means is a cable pull which displaces the tie rod with the effect of steering the wheel concerned inward; another by the fact that the connecting means leads to a separating device which severs the tie rod.

A further supporting measure involves a force source which, in the event of a collision, exerts an outwardly directed force directly or indirectly on the deflector acts on the deflector. As a result, even under particularly unfavorable circumstances, it is ensured that the wheel concerned is engaged around.

Finally, in a development of the inventive concept, the further bearing is fitted on the longitudinal member behind a crashbox (24) forming the front end thereof (claim 11). It is therefore ensured, in the event of a collision with a greater degree of offset and higher collision speed, that the deflector cannot be pivoted. In this case, the wheel concerned cannot pivot inward and the impact path via the wheel to the sill is not interrupted. As a result, in the event of severe collisions, more impact energy can be absorbed.

BRIEF DESCRIPTION OF THE DRAWINGS

The invention is described and explained below with reference to figures which depict the following.

DETAILED DESCRIPTION

Figure 1:
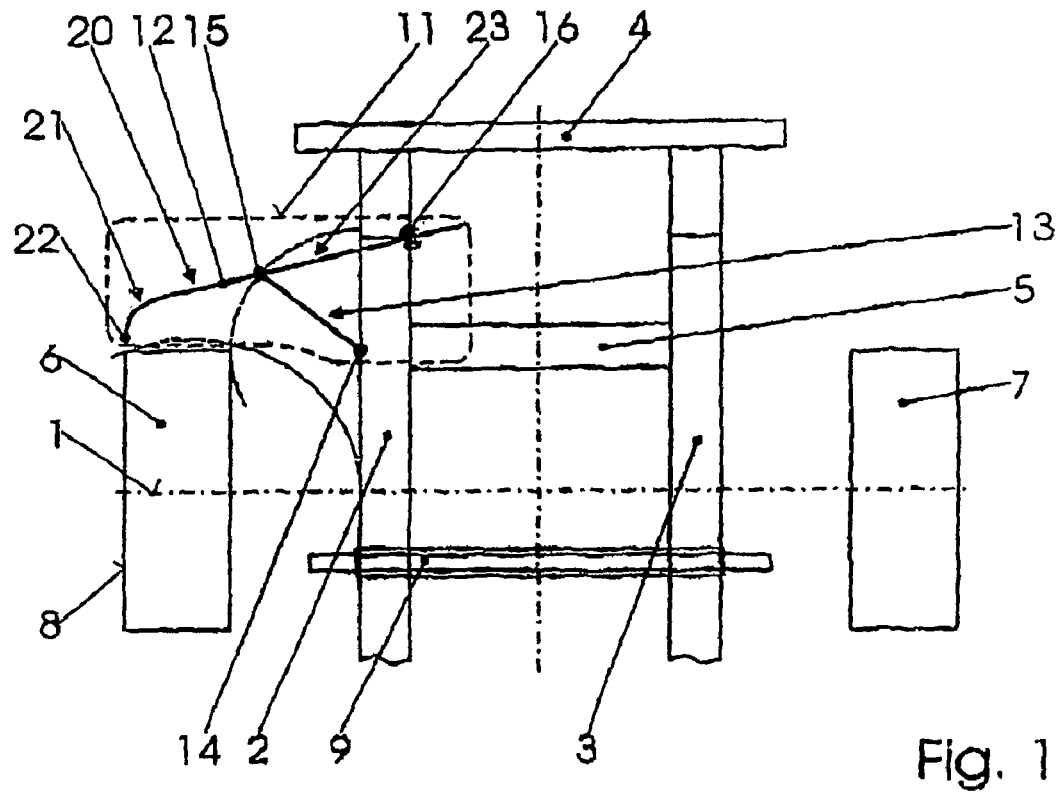
FIG. 1: a first embodiment of the device according to the invention in the inoperative position.

In FIG. 1, the front end of a motor vehicle is indicated only by means of its two longitudinal members 2, 3, a bumper support 4, a crossmember 5 and the centerline 1 of the front axle. In the following text, only the left side with the left front wheel 6 and the left longitudinal member 2 is described; however, the same also applies to the right side of the vehicle with the right front wheel 7 and the right longitudinal member 3. Furthermore, the steering mechanism 9 of a rack and pinion steering system, which steering mechanism is arranged behind the front axle, is also indicated.

A deflecting device 11 according to the invention which is surrounded as a whole by a dashed line is situated in front of the left front wheel 6, the outer vertical boundary surface of which is denoted by 8. The deflecting device 11 comprises a deflector 12 and a swinging arm 13 which form a kinematic chain, here a slider crank mechanism. The swinging arm 13 is pivotable in a bearing 14 connected to the longitudinal member 2 and acts on the deflector 12 at an outer pivot point 15 of the vehicle. The deflector 12, for its part, is guided in a pivotal and displaceable manner with its vehicle-inner section 23 in a further bearing 16 connected to the longitudinal member 2. The further bearing 16 is therefore a pivotable sliding guide for the deflector 12. The deflector 12 is an arm which is of sufficiently rigid design and the vehicle-inner section 23 of which is guided in the described manner and the vehicle-outer section 20 of which protrudes beyond the pivot point 15 and, after a rearwardly directed curvature 21, ends at a point 22. Owing to the invention, the curve of the path of this point 22 forms an advantageous run rearward and outward, as a result of which the deflector 12 reliably acts on the outer vertical boundary surface of the wheel 6.

Figure 2:
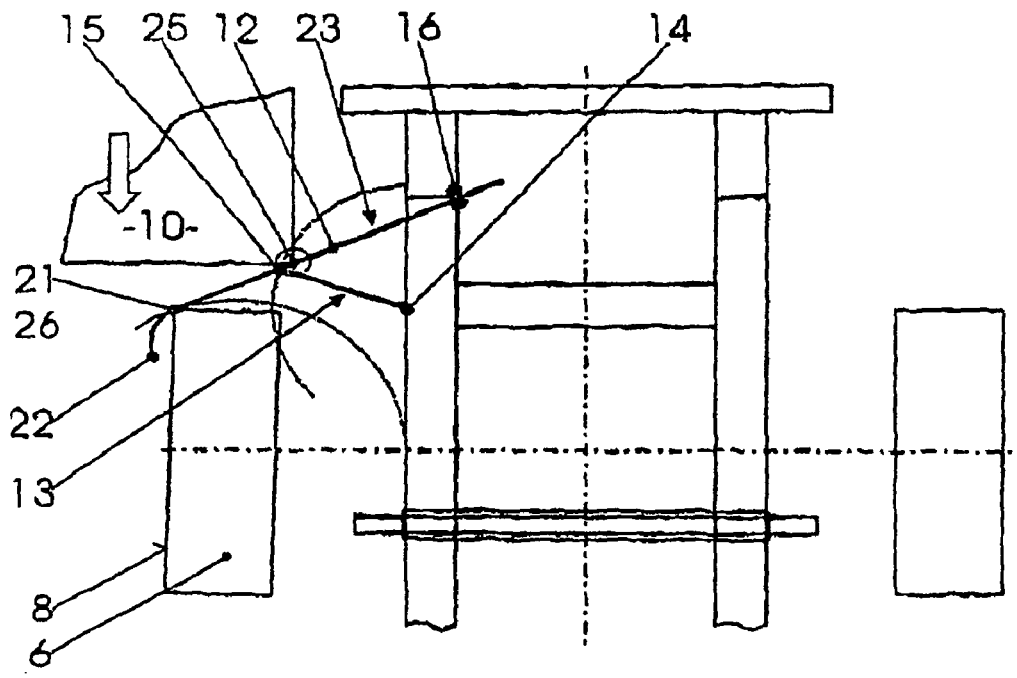
FIG. 2: as FIG. 1, in an operating position.

In FIG. 1, the deflecting device is in the inoperative position, i.e. here during normal travel without a collision. FIG. 2 shows the device in a stage of an offset frontal collision. The collision counterpart 10 is merely indicated here by means of its left, front corner. It has grasped the deflector 12 (contact point 25) and has already pivoted it to the rear until it touches the wheel 6. It can be seen that the deflector 12 has also been displaced to the outside, so that its end point 22 is outside the outer vertical boundary surface 8 of the wheel 6 and its rounded zone 21 touches the wheel 6 over the entire surface, but at least at point 26. In comparison with the position of FIG. 1, it can be seen that the deflector has not only been pivoted rearward but also has been displaced outward, so that it completely embraces the wheel 6. As a result, the wheel of the collision counterpart 10 can pass by the deflector without interlocking in the wheel protected in this manner. During this movement, the vehicle-inner section 23 of the deflector 12 has been displaced in the further bearing 16 to the outside of the vehicle.

Figure 3:
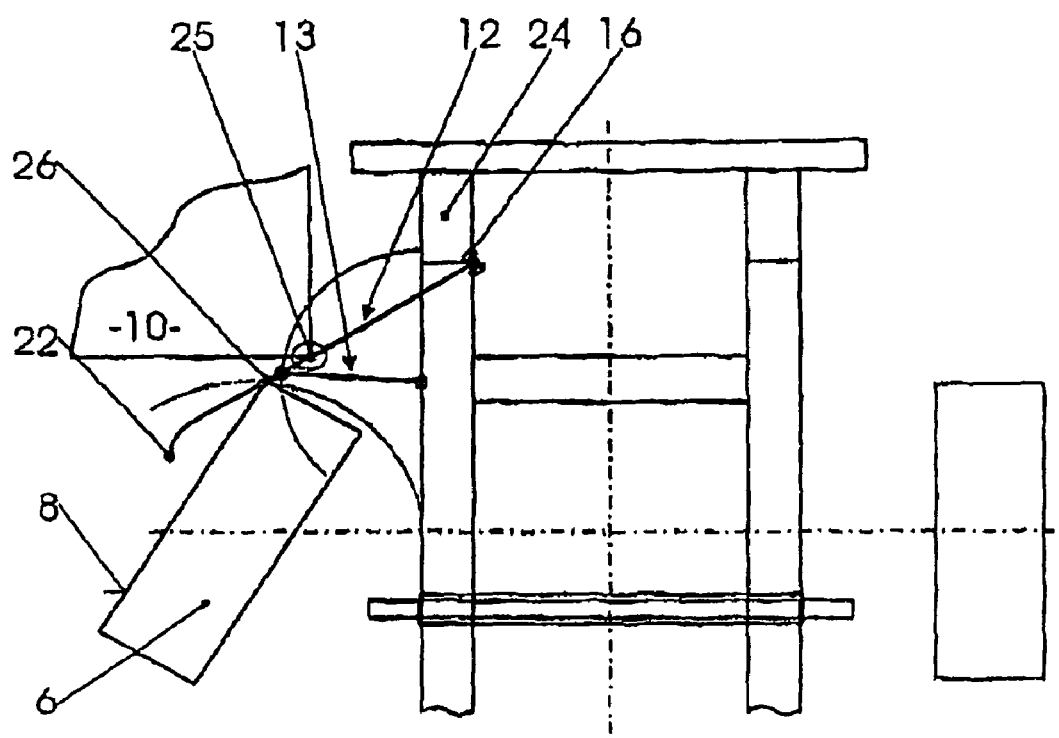
FIG. 3: as FIG. 1, in a further operating position.

Over the further course of the collision, the position of FIG. 3 can also be reached. The deflector 12 has been pivoted further to the rear and pulled further out of the bearing 16, with it having locked the wheel 6 inward. As a result, the outer vertical boundary surface 8 of the wheel 6 forms a sliding surface for the collision counterpart, in particular for the left front wheel thereof, so that the front wheels of the two vehicles do not interlock. It can also be seen in FIG. 3 that the bearing 16 is fitted on the longitudinal member (2) behind a crashbox (24) forming the front end thereof. During an offset frontal collision with a relatively great offset, in which the frame longitudinal member is already deformed (this is referred to as a 40:60 offset), the effect according to the invention is prevented as a result. This is because, in the event of a collision of this type, the wheel concerned is not in any way to be pivoted inward, so that the impact-force conduction path via the wheel to the sill beginning behind it (this is the vehicle longitudinal member below the door) is not interrupted. Since this path is not required in minor collisions which the crashbox (24) can absorb by itself, the bearing 16 is arranged behind said crashbox.

Figure 4:
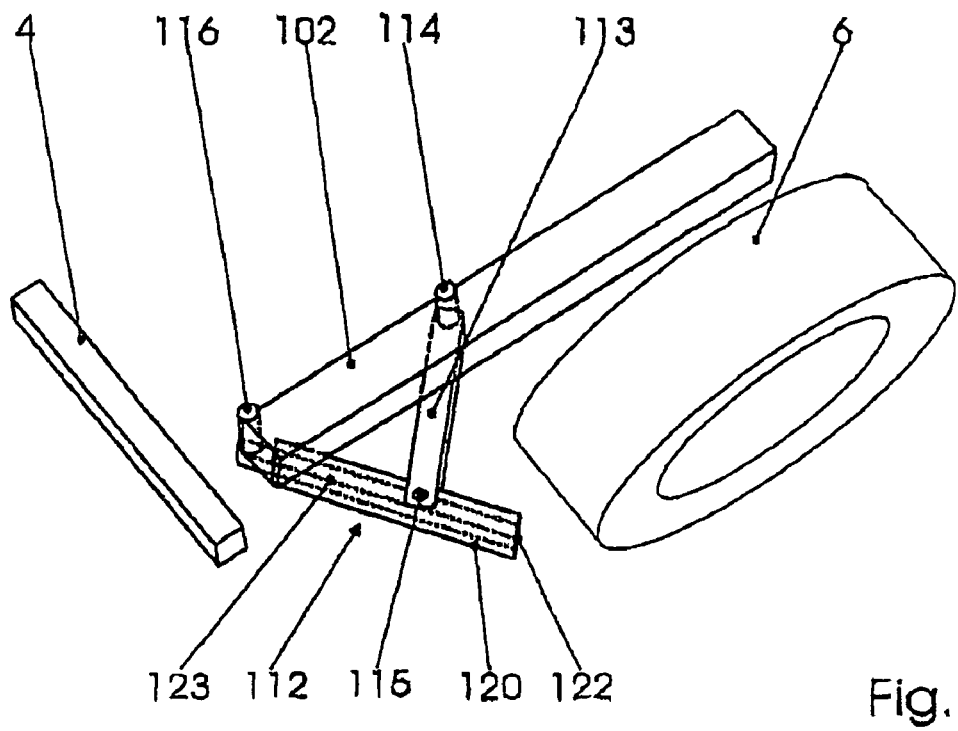
FIG. 4: a variant of the first embodiment in an inoperative position.
Figure 5:
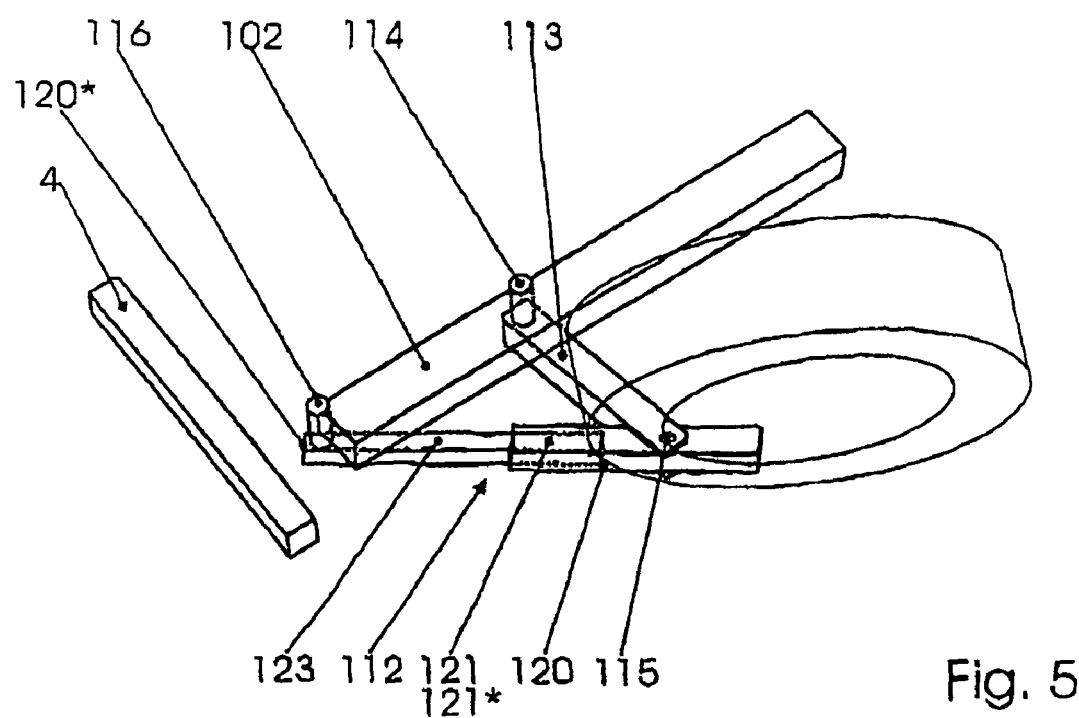
FIG. 5: as FIG. 4, in the event of a collision.

The variant of FIG. 4 and FIG. 5 differs therefrom through the different configuration of the deflector and the mounting thereof on the longitudinal member. The reference numbers of corresponding parts are increased here by 100. The deflector 112 here comprises two parts, a vehicle-inner part 123 and a vehicle-outer part 120, which parts can be displaced telescopically one inside the other in the form of a sliding guide 121. The vehicle-inner part 123 is preferably guided in the interior of the vehicle-outer part 120. The latter is connected at the pivot point 115 to the swinging arm 113 which, for its part, is coupled to the longitudinal member 102 at a bearing 114. The vehicle-inner part 123 is likewise coupled to the longitudinal member 102 at a further bearing 116. A force source (not visible in FIG. 5) can also be provided between the two parts 120, 123 of the deflector and, in the event of a collision, moves the two parts 120, 123 telescopically apart. The of the supply of energy or of the ignition of a charge generating a gas is indicated and referred to by 10*.

Figure 6:
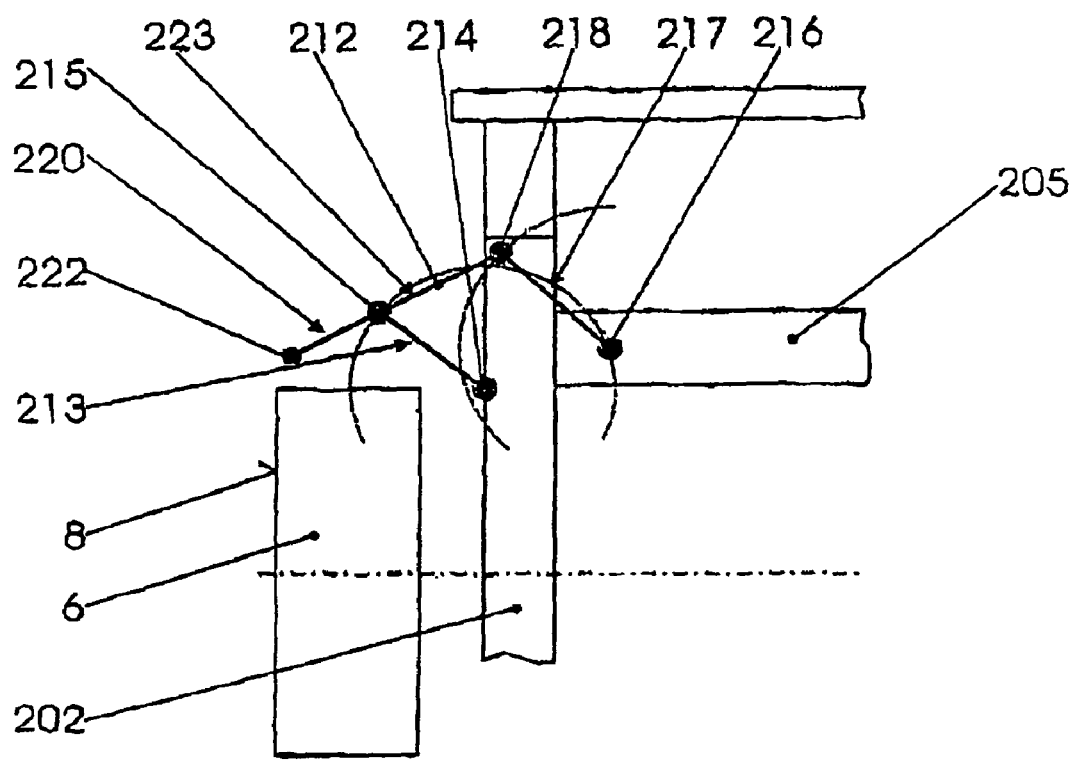
FIG. 6: a second embodiment of the device according to the invention in the inoperative position.

In the embodiment of FIG. 6, the kinematic chain is a four-bar linkage. It comprises a first swinging arm 213 which is pivotable about a bearing 214 connected to the longitudinal member 202, a further swinging arm 217 which is pivotable about a further bearing 216 connected to the crossmember 205, and a deflector 212 forming the coupling link of the four-bar linkage. The deflector 212 again comprises a vehicle-inner section 223 between the two pivot points 215, 218 and a vehicle-outer section 220 which is an extension beyond the pivot point 215. It ends at a point 222, the curve of the path of which will again surround the wheel 6 on its outer vertical boundary surface 8 over the course of the collision movement.

Figure 7:
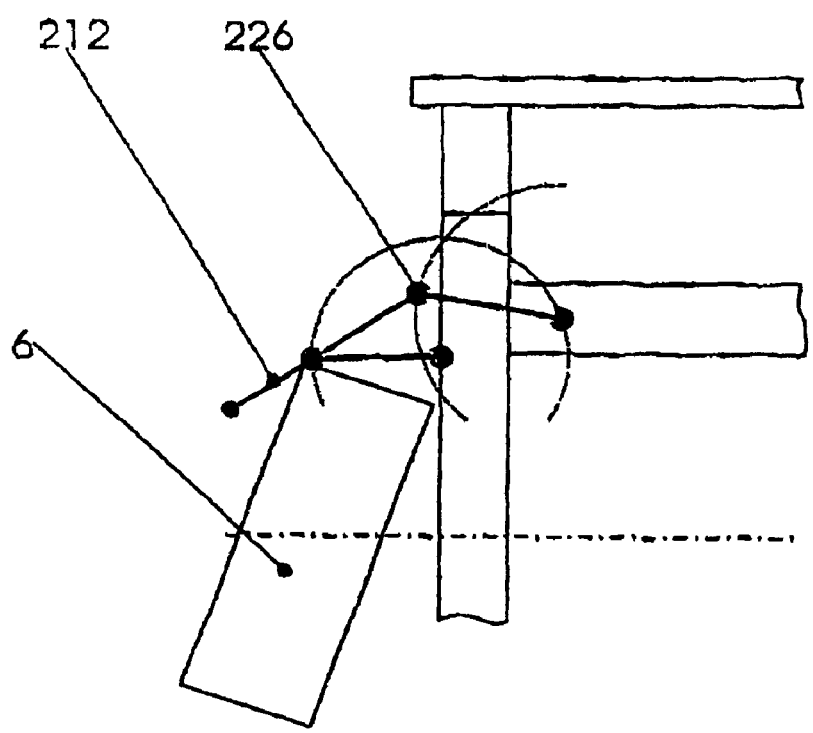
FIG. 7: as FIG. 6, in an operating position.

At an advanced stage of an offset frontal collision, the device passes into the position of FIG. 7. The deflector 212 has already forced the wheel 6 into a locked position. The contact point 226 between wheel 6 and deflector 212 is drawn in.

Figure 8:
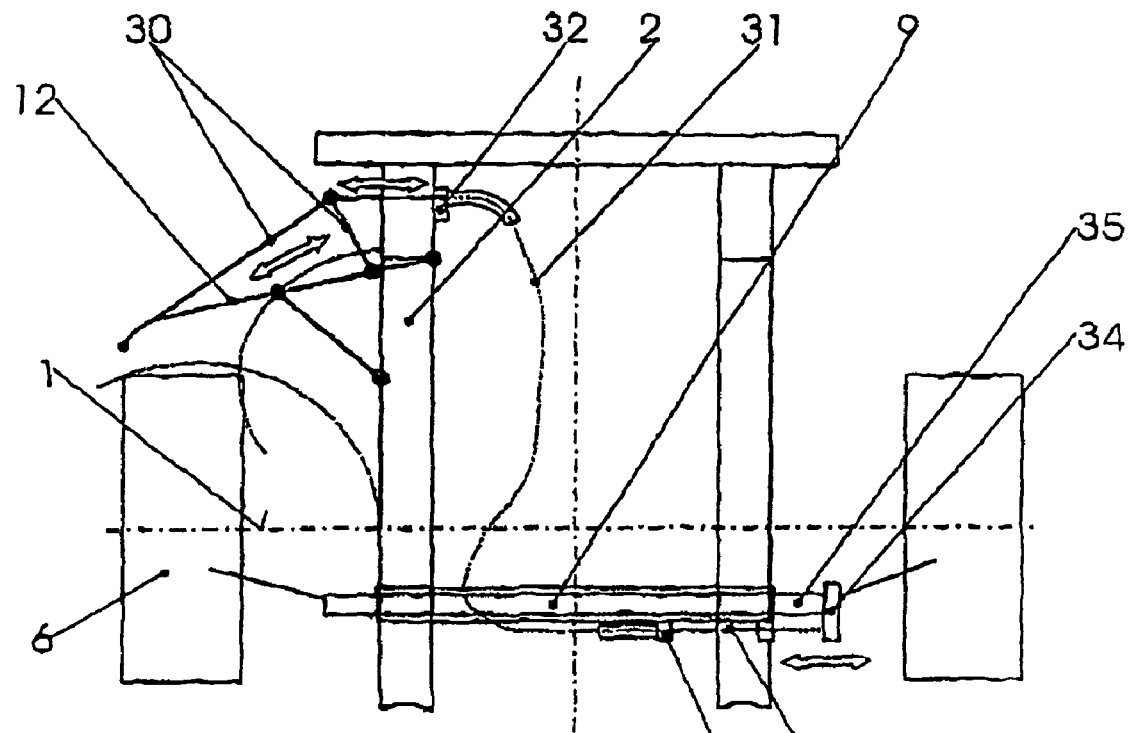
FIG. 8: as FIG. 1, with a first additional device.

FIG. 8 shows an additional device. It comprises an extension arm 30 which is connected to the deflector 12, guides a Bowden cable, provided between the receptacles 32 and 33, to the steering mechanism 9 and acts on a tab 34 fastened to the tie rod 35. As a result, in the event of a collision, with the steering mechanism 9 arranged behind the front axle 1, the tie rod is displaced in such a manner that it endeavors to pivot the left wheel 6 inward.

Figure 9:
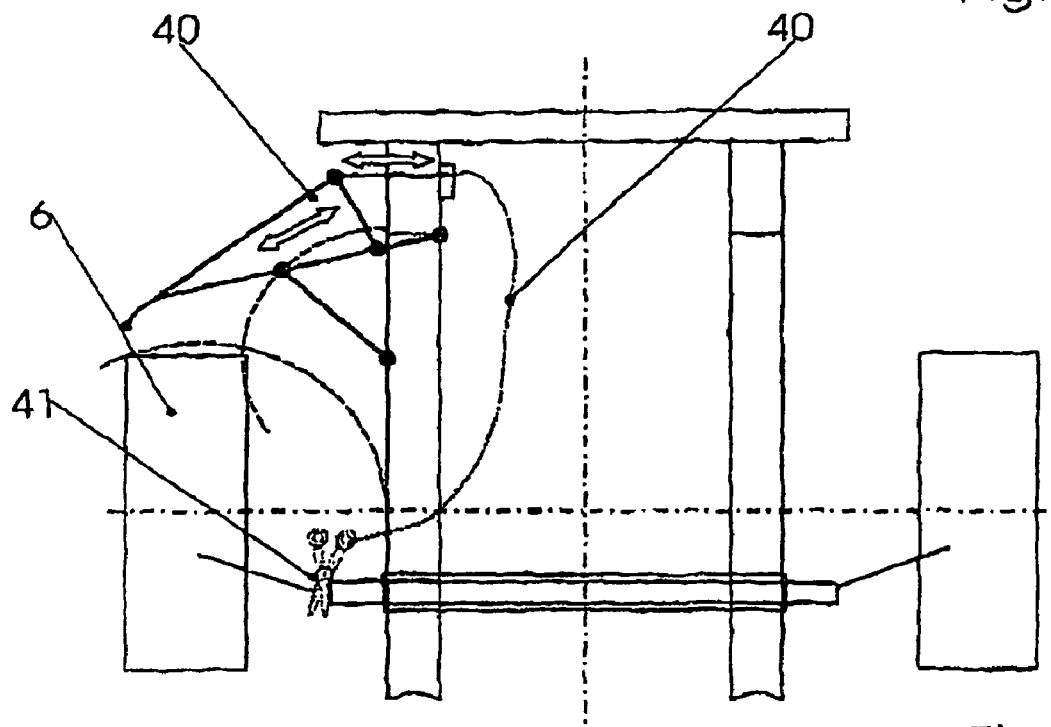
FIG. 9: as FIG. 1, with a second additional device.

Finally, a further additional device is indicated in FIG. 9. It comprises a connecting means 40, which may be mechanical, hydraulic or electric, and a separating device 41, here illustrated symbolically as a pair of shears, which severs the tie rod, so that the latter can no longer provide any resistance to an inward pivoting of the wheel 6. The separating device may act both mechanically and electrically or pyrotechnically.

Figure 10:
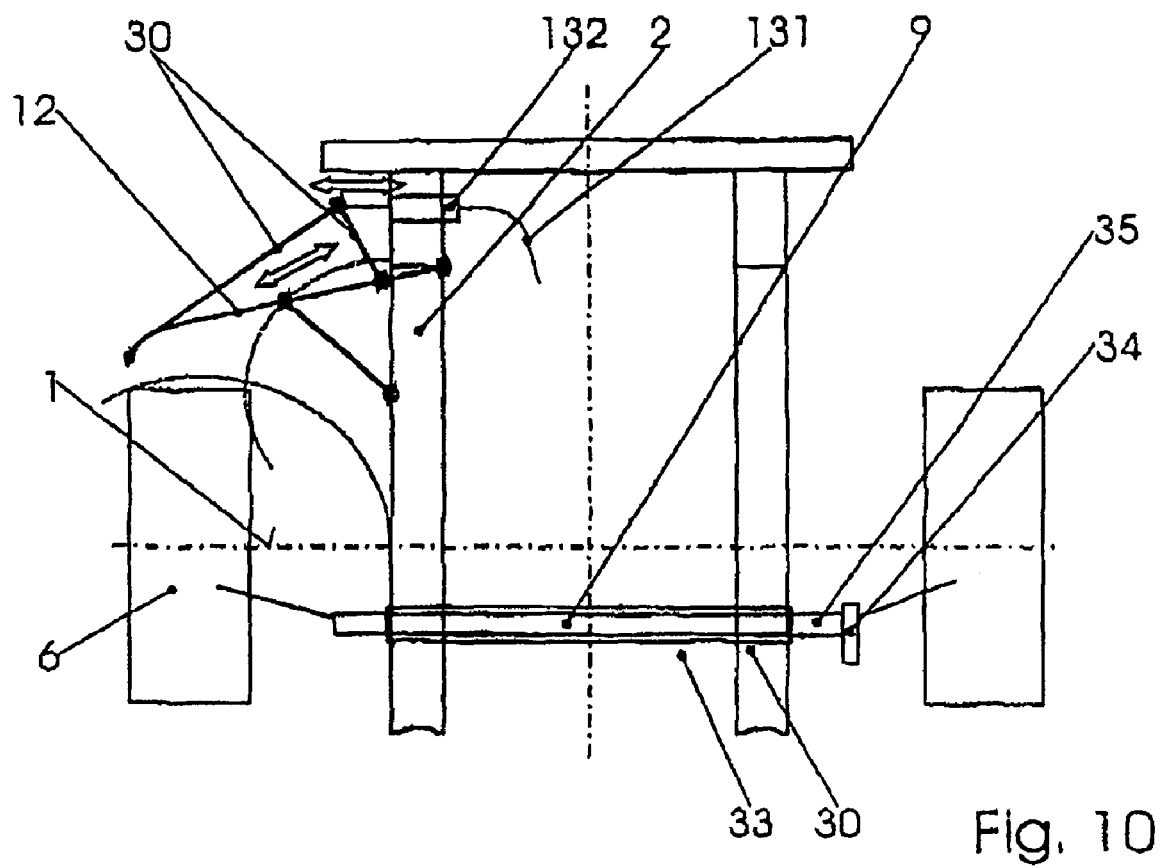
FIG. 10: as FIG. 8, with a further additional device.

FIG. 10 shows a variant to FIG. 8. In this figure, a force source 132 which is fastened to the frame member 2 acts on the extension arm 30 and displaces the extension arm and together with it the deflector 12 outwards in the event of a collision. Of the supply of energy or of the ignition of a charge generating a gas is indicated and denoted by 131.

The invention claimed is:

1. In a motor vehicle, a deflecting device for an offset frontal collision for the motor vehicle, the motor vehicle comprising a front end having a left and a right longitudinal member, the deflecting device is arranged in front of a front wheel of the motor vehicle and protects the front wheel in the event of a collision, wherein the deflecting device forms a kinematic chain which is situated approximately in a horizontal plane and the coupling link of which is a deflector which, under the action of a frontal impact, is positively guided to pivot rearward and to be displaced toward the outside of the vehicle, the kinematic chain comprises a four-bar linkage which comprises two swinging arms which are pivotable about bearings connected to the longitudinal member and the coupling link which is connected to the outer ends of the swinging arms at pivot points and reaches beyond the outer pivot point of the vehicle.

2. The deflecting device as claimed in claim 1, wherein the deflector, in a collision-free position, protrudes laterally in a manner inclined slightly rearward from the longitudinal member and has an outer end is bent rearward.

3. The deflecting device as claimed in claim 1, wherein a force source which, in the event of a collision, exerts an outwardly directed force on the deflector or a part thereof acts on the deflector.

4. In a motor vehicle, a deflecting device for an offset frontal collision for the motor vehicle, the motor vehicle comprising a front end having a left and a right longitudinal member, the deflecting device is arranged in front of a front wheel of the motor vehicle and protects the front wheel in the event of a collision, wherein the deflecting device forms a kinematic chain which is situated approximately in a horizontal plane and the coupling link of which is a deflector which, under the action of a frontal impact, is positively guided to pivot rearward and to be displaced toward the outside of the vehicle, the kinematic chain comprises a slider crank mechanism which comprises a swinging arm which is pivotable about bearings connected to the longitudinal member, a further bearing, a sliding guide and the coupling link which is connected to the outer end of the swinging arm at a pivot point and is guided in the further bearing and reaches beyond the outer pivot point of the vehicle.

5. The deflecting device as claimed in claim 4, wherein the sliding guide is arranged in the further bearing.

6. The deflecting device as claimed in claim 4, wherein the deflector comprises two parts which are displaceable telescopically one inside the other, the inner of the two parts being mounted pivotably in the further bearing and the outer of the two parts being connected to the one swinging arm at a pivot point, and in that the sliding guide is provided between the parts which are displaceable one inside the other.

7. The deflecting device as claimed in claim 4, wherein the further bearing is fitted on the longitudinal member behind a crashbox forming the front end thereof.

8. In a motor vehicle, a deflecting device for an offset frontal collision for the motor vehicle, the motor vehicle comprising a front end having a left and a right longitudinal member, the deflecting device is arranged in front of a front wheel of the motor vehicle and protects the front wheel in the event of a collision, wherein the deflecting device forms a kinematic chain which is situated approximately in a horizontal plane and the coupling link of which is a deflector which, under the action of a frontal impact, is positively guided to pivot rearward and to be displaced toward the outside of the vehicle, and a connecting means which acts on the tie rod of the steering system of the motor vehicle acts on the deflector.

9. The deflecting device as claimed in claim 8, wherein the connecting means is a cable pull which displaces the tie rod with the effect of steering the wheel concerned inward.

10. The deflecting device as claimed in claim 8, wherein the connecting means leads to a separating device which severs the tie rod.

* * * * *